(12) United States Patent
Hiltunen et al.

(10) Patent No.: US 8,626,691 B2
(45) Date of Patent: Jan. 7, 2014

(54) METHODS, SYSTEMS, AND PRODUCTS FOR ESTIMATING ANSWERS TO QUESTIONS

(75) Inventors: Matti Hiltunen, Morristown, NJ (US); Robin Berthier, College Park, MD (US); Michel Cukier, Rockville, MD (US); David Kormann, Morristown, NJ (US); Daniel Sheleheda, Florham Park, NJ (US); Gregory T. Vesonder, Boonton Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 486 days.

(21) Appl. No.: 12/642,783

(22) Filed: Dec. 19, 2009

(65) Prior Publication Data

US 2011/0153537 A1    Jun. 23, 2011

(51) Int. Cl.
*G06F 17/00*    (2006.01)
*G06N 5/02*    (2006.01)

(52) U.S. Cl.
USPC .......................................................... 706/47

(58) Field of Classification Search
USPC .......................................................... 706/47
See application file for complete search history.

(56) References Cited

U.S. PATENT DOCUMENTS

| | | | |
|---|---|---|---|
| 6,182,136 B1 | 1/2001 | Ramanathan et al. | |
| 6,321,338 B1 | 11/2001 | Porras et al. | |
| 6,363,489 B1 | 3/2002 | Comay et al. | |
| 6,453,345 B2 | 9/2002 | Trcka et al. | |
| 7,164,657 B2 | 1/2007 | Phaal | |
| 7,441,429 B1 | 10/2008 | Nucci et al. | |
| 7,512,980 B2 | 3/2009 | Copeland et al. | |
| 8,234,238 B2 * | 7/2012 | Keith, Jr. .......................... | 706/60 |
| 2002/0133586 A1 | 9/2002 | Shanklin et al. | |
| 2004/0083092 A1 * | 4/2004 | Valles ............................... | 704/9 |
| 2004/0187032 A1 | 9/2004 | Gels et al. | |
| 2005/0086045 A1 * | 4/2005 | Murata ............................. | 704/2 |
| 2005/0114327 A1 * | 5/2005 | Kumamoto et al. ............... | 707/3 |
| 2006/0294037 A1 * | 12/2006 | Horvitz et al. ................... | 706/46 |
| 2007/0248084 A1 | 10/2007 | Whitehead | |
| 2008/0291915 A1 | 11/2008 | Foschiano | |
| 2009/0287678 A1 * | 11/2009 | Brown et al. ..................... | 707/5 |
| 2010/0150004 A1 * | 6/2010 | Duffield et al. ................. | 370/252 |

OTHER PUBLICATIONS

Building a Better NetFlow Cristian Estan cestan@cs.ucsd.edu SIGCOMM'04, Aug. 30-Sep. 3, 2004, Portland, Oregon, USA.*

* cited by examiner

*Primary Examiner* — Kakali Chaki
*Assistant Examiner* — Ababacar Seck
(74) *Attorney, Agent, or Firm* — Scott P. Zimmerman, PLLC

(57) ABSTRACT

Methods, systems, and products answer questions using heuristics. A question and an input are received. A set of heuristic rules is retrieved, and the question is answered by evaluating an accuracy of each heuristic rule. Multiple accuracies from the set of heuristic rules are combined to produce a confidence level for the answer to the question.

20 Claims, 14 Drawing Sheets

FIG. 8

| Week | Number of Flows | | | | Number of Hosts | |
|---|---|---|---|---|---|---|
| | External Client Activity | Internal Server Activity | External Scan Activity | Internal Scan Activity | External | Internal |
| 37 | | 2 | | | | 1 |
| 38 | | 6 | | | 1 | 3 |
| 39 | 2 | 6 | 46,442 | | 1 | 3 |
| 40 | | 22 | 6,837 | | 1 | 11 |
| 41 | 2 | 4 | 48,724 | | 1 | 2 |
| 42 | | 6 | | | 1 | 3 |
| 43 | | 18 | 18,226 | 2,723 | 5 | 10 |
| 44 | 16 | 18 | 62,116 | | 1 | 9 |
| 45 | | 6 | | | | 3 |
| 46 | 2 | 12 | 2,025 | | 3 | 5 |
| 47 | 16 | 18 | 147,439 | 482,315 | 5 | 11 |
| 48 | | 2 | 57,750 | | 3 | 1 |
| 49 | | 6 | | | 1 | 4 |

METHODS, SYSTEMS, AND PRODUCTS FOR ESTIMATING ANSWERS TO QUESTIONS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to electrical computers and, more particularly, to heuristic prediction.

Heuristics may be used to solve difficult problems. Computer science uses heuristic algorithms to produce acceptable solutions to challenging problems. Heuristics, for example, could be used to improve computer networks.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 7 and 8 are schematics illustrating case studies, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
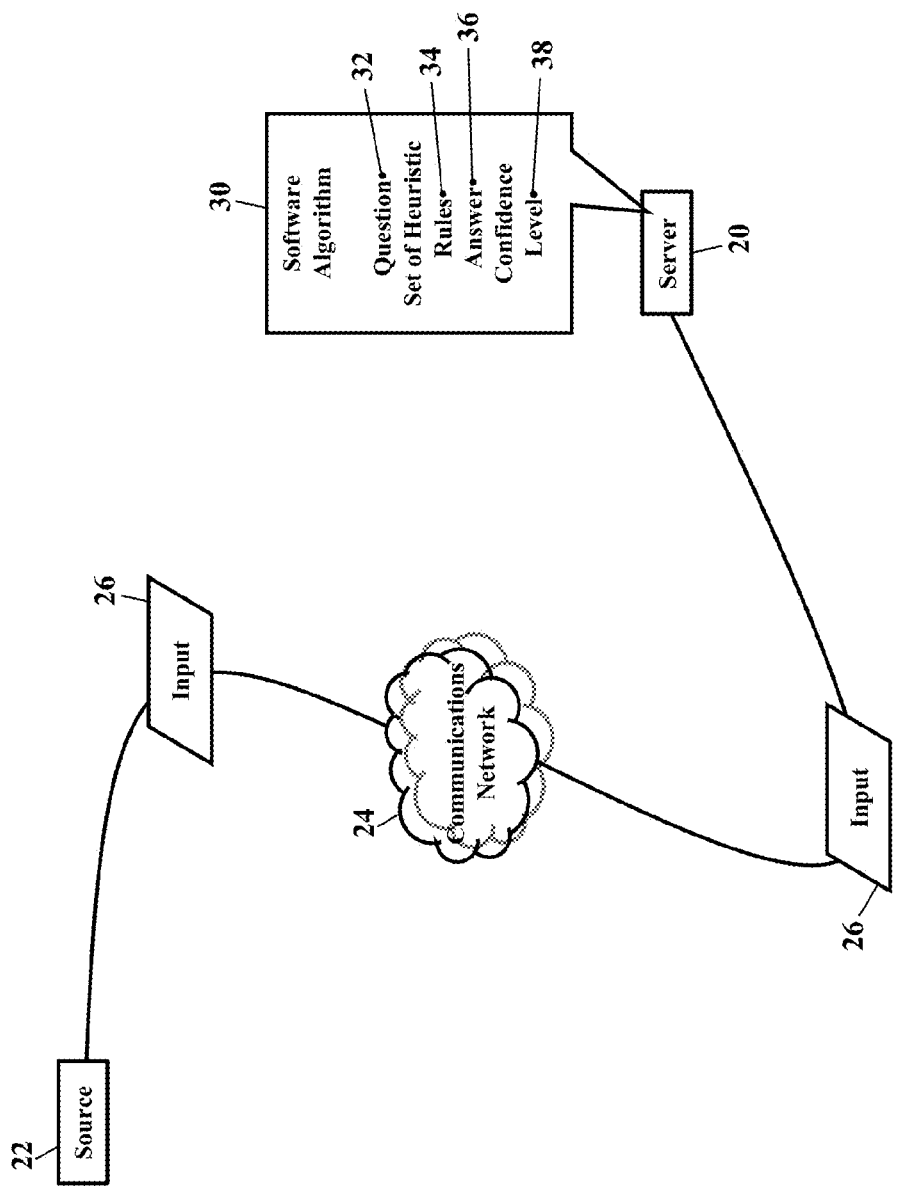
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that uses heuristics to estimate answers to questions. A server 20 communicates with a source device 22 via a communications network 24. The server 20 receives an input 26 from the source device 28. The server 20 stores and executes a software algorithm 30 that answers a question 32 about the input 26 from the source device 28. The question 32, though, may have no straight forward or readily apparent answer, and no methodology may be known to reliably answer the question 32 based on the input 26. The software algorithm 30, then, accesses a set 34 of heuristic rules to answer the question 32. By definition, though, the question 32 has no straight forward answer or analysis methodology, so no heuristic rule is able to always reliably answer the question 32. For simplicity, then, each heuristic rule in the set 34 of heuristic rules may be "true" or "false" (or "yes" or "no," depending on the question 32).

The software algorithm 30 analyzes the set 34 of heuristic rules. The software algorithm 30 evaluates an accuracy of each heuristic rule using ground truth. For example, the software algorithm 30 may determine heuristic H1 is correct 80% of the time. Given set 34 of heuristic rules, the software algorithm 30 may combine the heuristic rules to arrive at an answer 36 to the question 32 within a confidence level 38. The software algorithm 30, in other words, produces the answer 36 within a probability.

Some examples help explain the use of heuristics. Suppose the server 20 receives the input 26 as NetFlow information from a router. As those of ordinary skill in the art understand, NetFlow is a network protocol for collecting Internet Protocol traffic information. Other inputs could firewall logs, packet traces, and sensor readings from sensors. The input 26, in fact, may be any stream of data. Regardless, the question 32 might be "what services are running in the communications network 24?" The question 32 may also be "which machines (if any)

are infected by a virus?" or "which machines are part of a botnet?" Other questions may include "did a human move through a field instrumented by motion sensors?" One problem, of course, is that it is hard or even impossible to get the right kind of information to produce the answer 36 to the question 32. If all the software algorithm 30 receives is the input 26, then the software algorithm 30 must develop the answer 36 using the given input 26. Another problem is that for any observation, there is a chance that the observation is normal behavior (e.g., a user that sends a lot of email messages verses a machine infected by a spam bot or a deer in the field instead of a human). The software algorithm 30 may thus assume that each heuristic returns a true or false (or a specific yes/no, such as "is machine X infected by a virus?"). The answer 36 may thus indicate that heuristic H1 is correct 80% of the time (in other words, if machine X is indeed infected, then heuristic H1 will detect that with 80% probability). By combining all the heuristics, the software algorithm 30 provides a combined estimate for the question 32. Continuing with the virus example, based on the combined heuristics, the software algorithm 30 determines with 99% probability that server X is infected by a virus.

Figure 2:
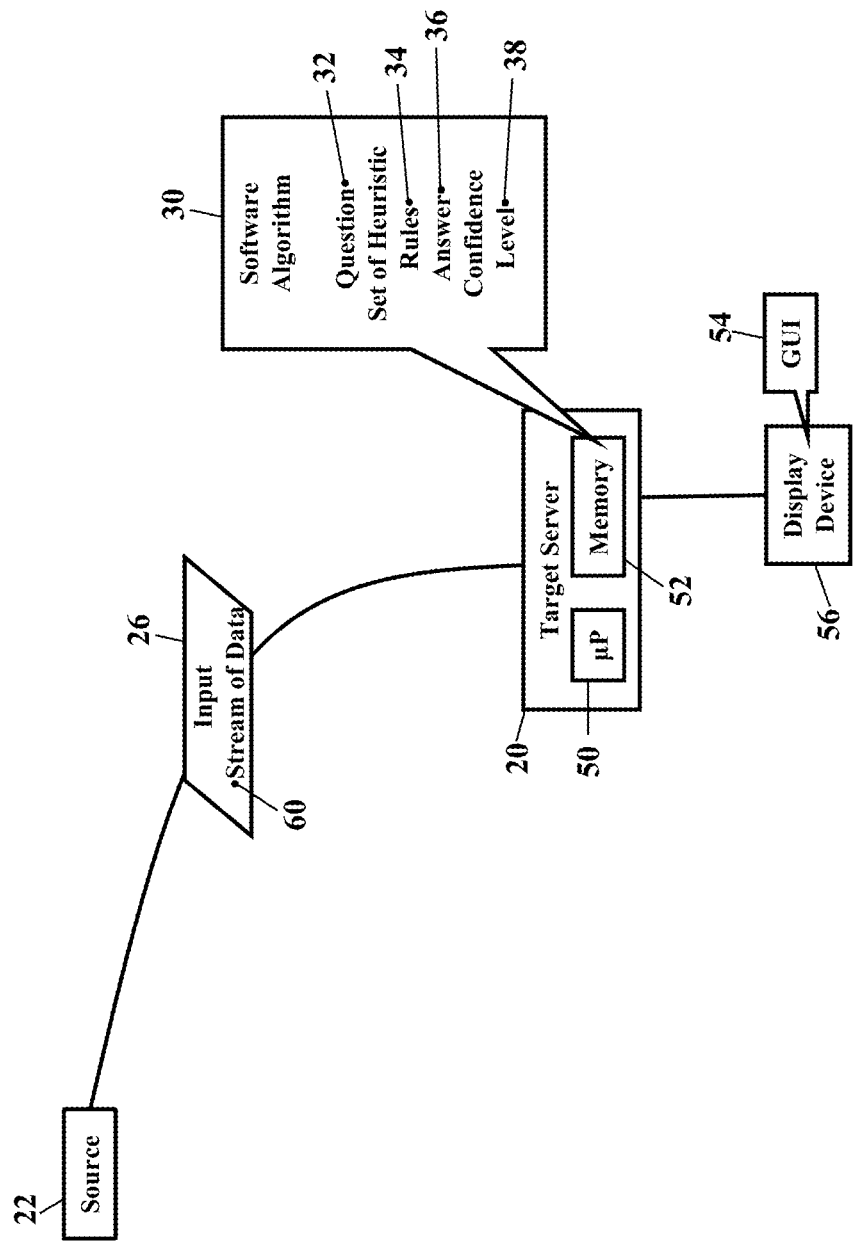
FIG. 2 is a more detailed schematic illustrating the operating environment, according to exemplary embodiments.

FIG. 2 is a more detailed schematic illustrating the operating environment, according to exemplary embodiments. The server 20 has a processor 50 (e.g., "µP"), application specific integrated circuit (ASIC), or other component that executes the software algorithm 30 stored in a memory 52. The software algorithm 82 may cause the processor 50 to produce a graphical user interface ("GUI") 54. The graphical user interface 54 is illustrated as being visually produced on a display device 56, yet the graphical user interface 54 may also have audible features. The software algorithm 30, however, may operate in any processor-controlled device, as later paragraphs will explain.

The server 20 receives the input 26 from the source device 22. The software algorithm 30 analyzes the input 26 (e.g., any stream 60 of data) to determine the answer 36 to the posed question 32. Because the question 32 has no straight forward or readily apparent answer, the software algorithm 30 retrieves the set 34 of heuristic rules to answer the question 32. The set 34 of heuristic rules is illustrated as being locally stored in the memory 52, but the set 34 of heuristic rules may be remotely accessed and maintained at any location in the communications network (illustrated as reference numeral 26 in FIG. 1). Regardless, the software algorithm 30 analyzes the set 34 of heuristic rules to determine the answer 36 within the confidence level 38.

The above analysis may be used to passively detect any services running, for example, in an internal (e.g., corporate) network. The approach scales to large networks, has minimal overhead to the network being monitored, and by providing continuous monitoring, will detect any service that ever communicates with the external networks. The software algorithm 30 uses novel techniques to combine information from heuristics, each of which by itself is unreliable. By comparing the list of detected services against the list of legitimate known services, the network operators can quickly detect any new rogue services.

Knowledge of what services are running in their networks is critical for network and security administrators. For example, an infected computer (e.g., a "bot") often runs services that listen for commands from their controllers. Furthermore, the security policy of the organization may disapprove certain services (e.g., known vulnerable services, P2P, etc.). Exemplary embodiments may thus be used to identify rogue servers and compromised computers in an internal network based on a combination of passive service discovery and historical comparison. Exemplary embodiments provide a simple yet effective method to continuously and accurately detect the entire population of servers in a given network. The network and security administrators may then validate the legitimate services and be alerted when suspicious services appear.

Exemplary embodiments may use NetFlow as the input 26. NetFlow is a known network protocol for collecting Internet Protocol traffic information. NetFlow is implemented in most routers and collects summarized traffic information using packet headers. More precisely, a network flow is defined as a unidirectional sequence of packets that share source and destination IP addresses; source and destination port numbers (for TCP or UDP, 0 for other protocols); and the IP protocol (e.g., TCP or UDP). A NetFlow record carries a wide variety of network-related information including: timestamp of the first packets received, duration, total number of packets and bytes, input and output interfaces, IP address of the next hop, source and destination IP masks and cumulative TCP flags in the case of TCP flows.

Some terms may be helpful. The server 20 may be a network application that provides a service by receiving request messages from clients and generating response messages. The server 20 may be hosted on a computer identified by its IP address and accepts requests sent to a specific port. Exemplary embodiments may utilize any servers, such as those using the UDP and TCP protocols, both temporary and permanent. Exemplary embodiments may include peer-to-peer transactions, even if the server 20 may be handling client requests for only a few minutes and for only specific clients. An end point is defined as a tuple {IP address, IP protocol (TCP or UDP), Port number} and may represent any client or any server. A network session may be a valid communication between one client end point and one server end point. A network transaction may be any set of flows between two end points during a time window smaller than the maximum age limit of a flow (such as 15 minutes). There may be two types of network transactions: unidirectional and bidirectional. Exemplary embodiments may assume that bidirectional transactions are always between a client and a server and that bidirectional transactions are always initiated by a client. Exemplary embodiments, however, need not make this assumption, so that bidirectional transactions may be between any two devices and bidirectional transactions may be initiated by any device.

The task of accurately detecting servers based solely on NetFlow is challenging. NetFlow may not keep track of the logic of network sessions between clients and servers. Specifically, exemplary embodiments may address the following challenges. 1) NetFlow may break up the logical request and reply flows into multiple separate flows, 2) NetFlow is made of unidirectional flows and therefore exemplary embodiments may need to identify the matching unidirectional flows to make up bidirectional flows and identify valid network sessions, and 3) identifying the server end point in a network session is not always easy.

Exemplary embodiments may solve the first and second challenges by matching and merging the net-flows as follows. First, for each collection period (usually 5 minutes) exemplary embodiments merge all network flows that have the same source and destination end points to eliminate any artificial breaking of unidirectional flows. Then to address the issue of combining unidirectional flows into network sessions, exemplary embodiments may first generate bidirectional flows by merging all flows collected during a given time window that have opposite source and destination end points. Exemplary embodiments may then separate valid from invalid bidirectional flows as follows. All UDP flows are considered to be valid. TCP flows are valid only if both the request and reply flows carry at least two packets and the TCP acknowledgement flag. So for example, if a server refuses a TCP connection handshake by sending a reset flag to the source end point, then the bidirectional flow recorded for this transaction will be seen as invalid.

The last step may be to identify client and server end points for every valid bidirectional flow. This task is challenging because the TCP flags in the request and reply flows are typically identical for valid bidirectional flows. Furthermore, the flow timestamps have proven to be sometimes unreliable and more often, the request and reply flows have identical time stamps due to the granularity of the time stamps.

To achieve this task, exemplary embodiments may develop a set of heuristics that determine if an end point is a server (or not). Each heuristic uses one or more characteristics of each bidirectional flow to make its decision. These heuristics were developed to cover a variety of intuitions gathered from network experts. Exemplary embodiments may then combine the outputs from the different heuristics using a Bayesian inference framework. Bayesian inference provides the advantage of keeping track of previous detection evidence by updating the accuracy of the server identification process over time. The heuristics may include:

H.0: Flow timing: This heuristic uses the difference in the timestamps of the unidirectional flows constituting the bidirectional flow to decide which one is the request and which one is the reply. A large time difference will increase the probability to identify the client and the server end points, while a small time difference of only 1 or 2 milliseconds will decrease the probability to correctly identify clients and servers, and if flows have the same timestamp, then this heuristic cannot decide. For example, let $t_1$ and $t_2$ be the time stamps of the unidirectional flows constituting a bidirectional flow. The source of the flow with the larger time stamp is likely the server. The difference between $t_1$ and $t_2$ provides an indication on the probability that this heuristic will identify the correct end point as server. If the time stamps are identical, there is no evidence one way or the other.

H.1: Port number: This heuristic may rely on the fact that servers usually have a lower port number than clients. Let $p_1$ and $p_2$ be the port numbers associated with a bidirectional flow. The end point with the smaller port number is likely the server. If the port numbers are identical this heuristic does not provide any evidence.

H.2: Port number with threshold at 1024: This heuristic is similar to the previous one but applies a threshold of 1024 to decide between client and server ports. The value of 1024 corresponds to the limit under which ports are considered privileged and designated for well-known services. If an end point has a port number<1024, then it is likely a server. This heuristic is ignored if both ports are above or below 1024.

H.3: Port number advertised in /etc/services: If the port number of an end point is listed in the standard Unix file /etc/services that compiles assigned port numbers and registered port numbers, then it is likely a server. If both or neither of the port numbers are in the standard Unix file /etc/services, this heuristic may be ignored.

H.4: Number of distinct ports related to a given port: If two or more different port numbers are associated with an end point, the end point is likely a server. The number of different port numbers related to an end point provides an indication on the probability that this heuristic will correctly identify the server. This heuristic comes from the fact that ports on the client-side are often randomly selected. Therefore ports on the client-side of a connection are less likely to be used in other connections compared to ports on the server-side. If both of the end points are related to the same number of ports, then this heuristic may be ignored.

H.5: Number of distinct IP addresses related to a given end point: This heuristic is identical to heuristic H.4 but counts IP addresses instead of ports.

H.6: Number of distinct tuples related to a given end point: This heuristic is identical to heuristic H.5 above but counts end points instead of single IP addresses. This heuristic is based on the observation that each server typically has two or more clients that use the service. Furthermore, even if there is only one real user for the service (e.g., identified by the IP address of the user's machine), if the user accesses the service more than once, the client side of the access often uses different port numbers and thus, there are multiple end points (defined by {IP; protocol; port number}).

Exemplary embodiments may combine the evidence provided by the heuristics to get the best estimate of which end points are servers and which ones are clients by using basic Bayesian inference. Exemplary embodiments may consider each end point that is present in at least one bidirectional flow. For each end point X, two hypotheses are possible:

$H_s$ end point X is a server, and/or $H_c$ end point X is a client.

The different heuristics are used to identify evidence E in the bidirectional flows. We use training data with known ground truth to determine P(E|H), that is, the probability of evidence E being present in a flow or set of flows given that hypothesis H is true. Finally, let P(H) be the prior probability of hypothesis H (e.g., based on prior evidence). Then, the probability of a hypothesis H given the evidence E, P(H|E), can be updated using the basic formulation of Bayesian inference:

$$P(H \mid E) = \frac{P(E \mid H) * P(H)}{P(E)},$$

where $P(E)=\Sigma P(E|H_i)*P(H_i)$, where $H_i$ are all the possible hypotheses.

In order to combine the evidence provided by the different heuristics, exemplary embodiments determine the accuracy of each heuristic, that is, the probabilities $P(E|H_S)$ and $P(E|H_C)$ for each type of evidence E. These conditional probabilities can be determined either by using expert knowledge or by learning them from labeled data where the server identities are know. Exemplary embodiments use data labeled by Argus (http://www.qosient.com/argus/, 2009) as the ground truth. This dataset consists of 34.8 million NetFlow traffic collected at the border of the University of Maryland during 30 minutes. This dataset will be explained in later paragraphs.

FIGS. 3-6 are graphical user interfaces illustrating accuracies of heuristics, according to exemplary embodiments. For heuristics H.1, H.2 and H.3 which have binary output, P(E|H) is a single value. However for heuristics H.0, H.4, H.5 and H.6, P(E|H) may be built as a probability distribution. To assess empirically these distributions, FIGS. 3-6 are plots of the respective accuracies of heuristics H.0, H.4, H.5 and H.6 according to their output value (up to 10 seconds for H.0, and up to 100 for H.4, H.5 and H.6). Accuracy may be defined as the number of bidirectional flows correctly oriented based on ground truth from Argus divided by the total number of bidirectional flows processed. FIGS. 3-6 illustrate that the accuracy increases with the time difference between requests and replies (H.0), the number of related ports (H.4), the number of related IP addresses (H.5) and the number of related end points (H.6).

Figure 3:
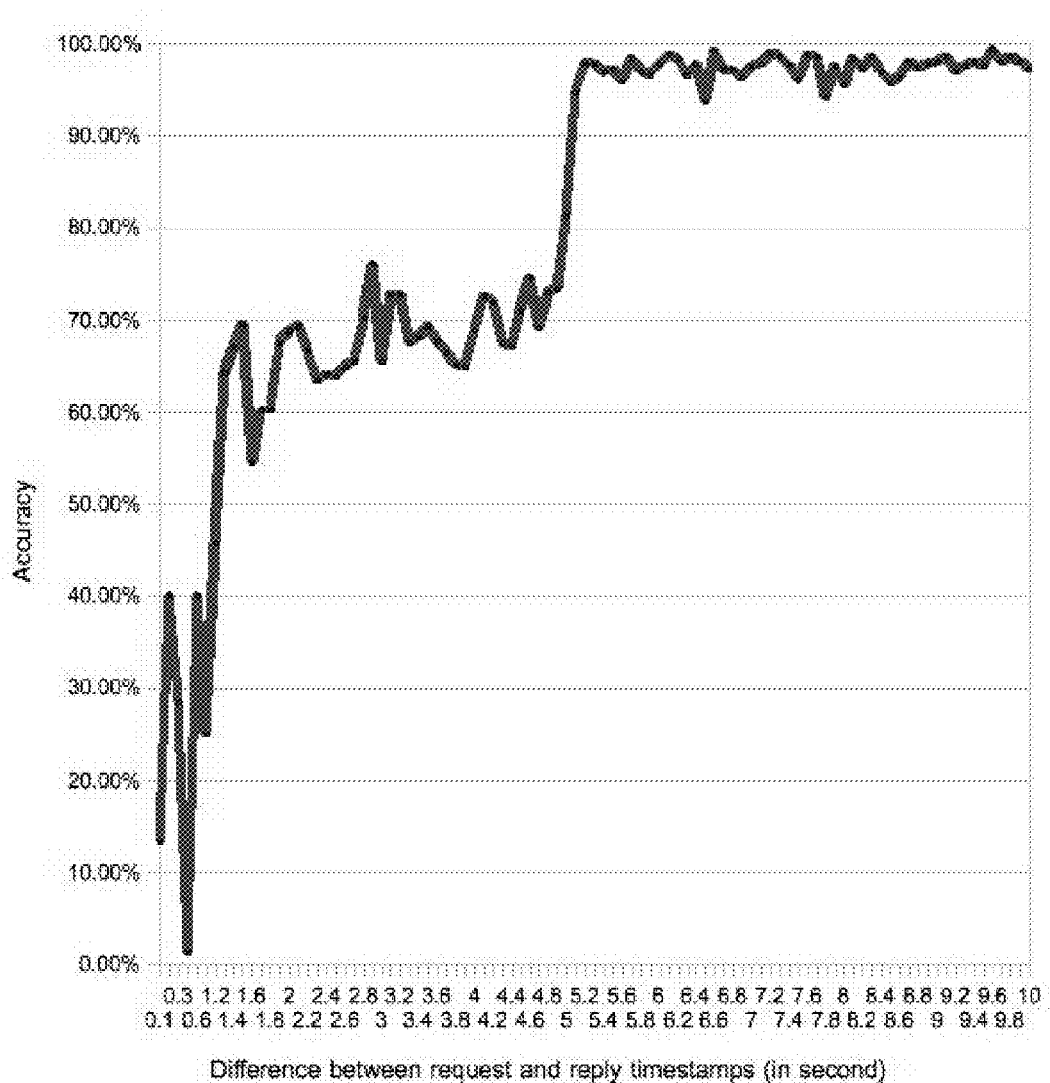
FIGS. 3-6 are schematics illustrating accuracies of heuristics, according to exemplary embodiments.
Figure 4:
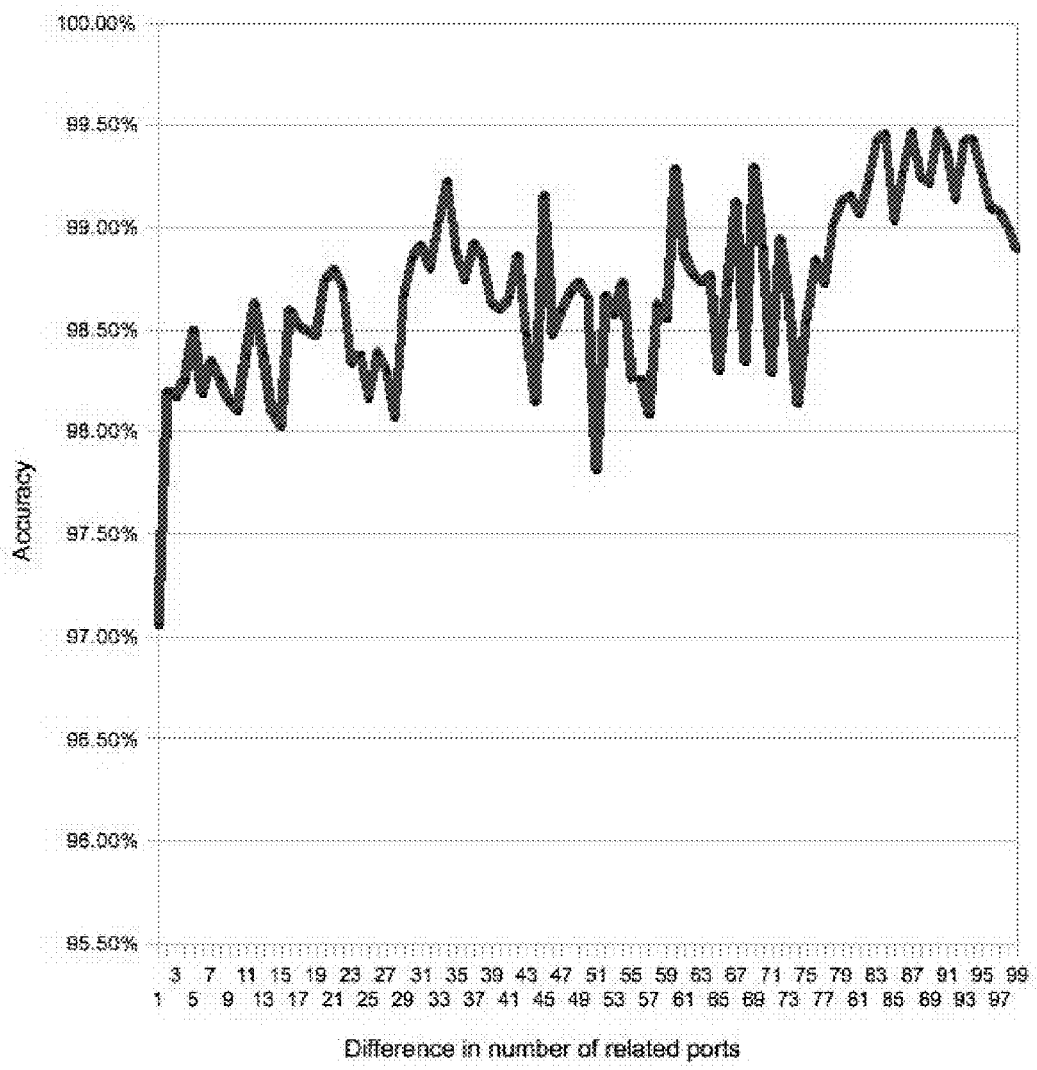
Figure 5:
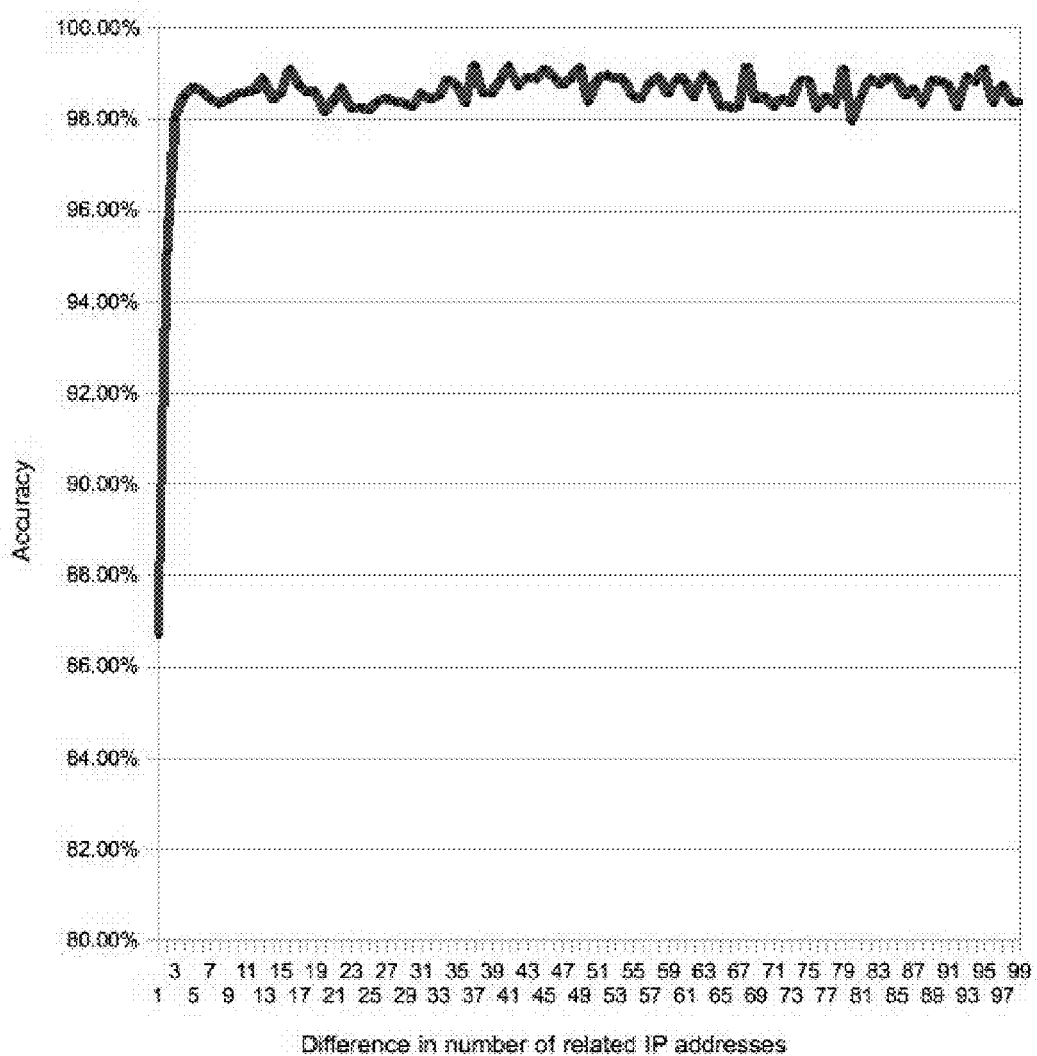
Figure 6:
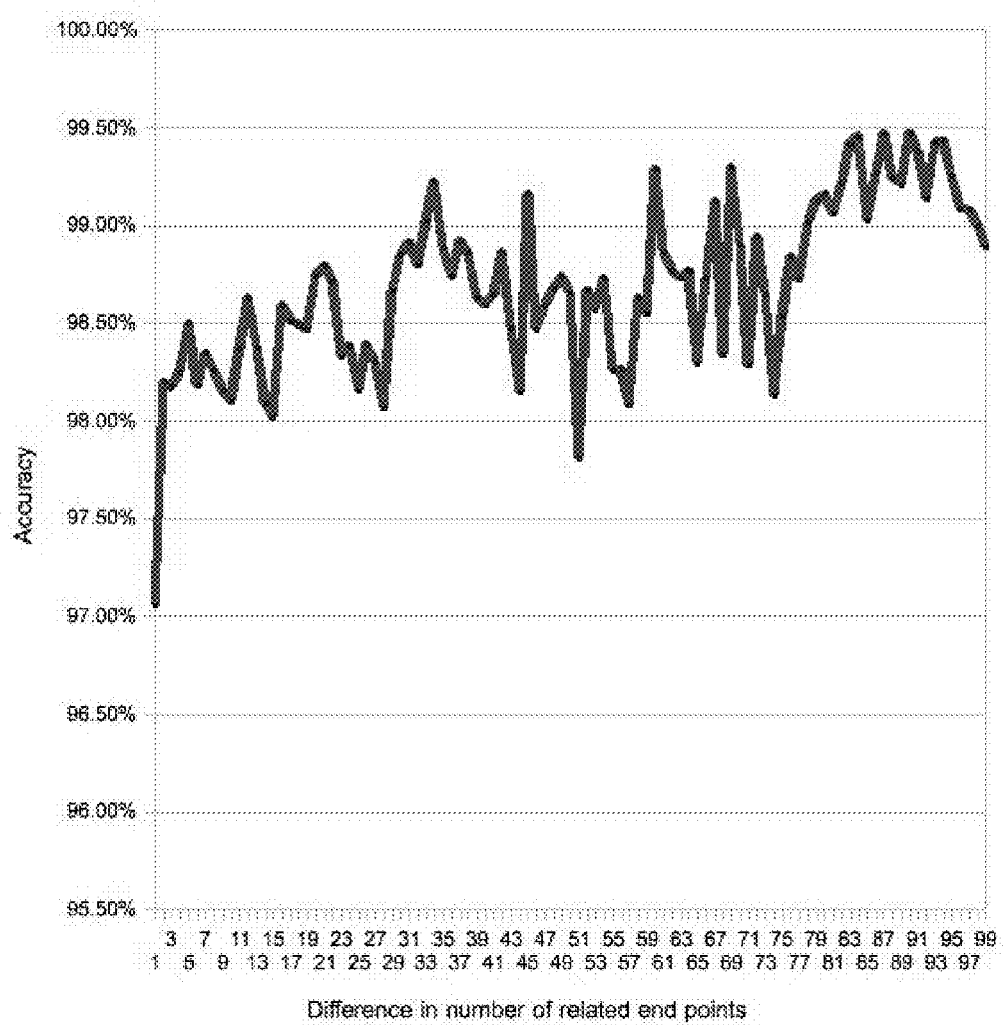

FIG. 3 illustrates $P(E|H_s)$ of H.0 with increasing difference in timestamp difference between request and reply flows. FIG. 4 illustrates $P(E|H_s)$ of H.4 with increasing number of related port numbers. FIG. 5 illustrates $P(E|H_s)$ of H.5 with increasing number of related IPs. FIG. 6 illustrates $P(E|H_s)$ of H.6 with increasing number of related end points. FIGS. 4 and 6 illustrate a similar plot, which can be explained by the fact that client ports are randomly selected among 64,511 values, so the number of client ports and the number of clients are different only in the rare cases where two clients communicating with the same server randomly select the same source port.

To fully implement the results from FIGS. 3-6, the next step may include fitting a distribution to the empirical results of each heuristic. This task, though, may require further analysis and the collection of additional empirical data. Exemplary embodiments, however, may be simpler by working with single values for $P(E|H)$. These values were calculated empirically for each heuristic using their average accuracies. An evaluation of the empirical calculations is presented below. The implementation and evaluation of probability distributions, however, will be conducted in future work.

The accuracy of the exemplary embodiments may be evaluated by addressing two related issues:
1. Generating correctly oriented bidirectional flows, and
2. accurately identifying server end points.

The first issue was evaluated by comparing the bidirectional flows generated from the same dataset using the software application 30 and using Argus, which is a packet-based bidirectional flow generator discussed above. The second issue was evaluated by comparing the list of network services discovered by the software application 30 and by the Passive Asset Detection Service (or "PADS") from the same dataset. As those of ordinary skill in the art understand, PADS is a packet-based passive service discovery tool. The inventors assumed PADS and Argus to be more accurate than the software application 30 and able to produce a baseline dataset for evaluation since they both work from detailed packet data instead of high level flow data. The goal of the below paragraphs is to measure exactly how much accuracy is lost by working only with flow.

First, though, the dataset is discussed. The dataset used for this evaluation includes raw packet data captured at the border of the University of Maryland network during a 30 minute interval. A total of 154.9 million packets were collected and these packets were exchanged between 56,977 internal hosts and 1.57 million external hosts. The raw packet dataset was divided into 17 files prior to being processed by each tool, in order to reproduce the conditions of a production environment where flows are processed in batches of a few minutes. Before being processed by the software application 30, the packet data had to be translated to unidirectional NetFlow data in order to replicate the behavior of a router. The Softflowd product (www.mindrot.org/projects/softflowd/) and Nfcapd from the Nfdump package (P. Haag: Watch Your Flows with NJSen and NFDUMP, http://www.ripe.net/ripe/meetings/ripe-50/presentations/ripe50-plenary-tue-nfsennf-dump.pdf) to complete this task. A total of 34.8 million unidirectional Netflows were generated. The flows can be partitioned into:

11.21 million TCP flows,
23.15 million UDP flows,
445,033 ICMP flows, and
28,717 other flows.

From the TCP and UDP flows, the software application 30 produced:
1.71 million unidirectional TCP flows,
9.23 million unidirectional UDP flows,
2.67 million bidirectional TCP flows from which 64,104 TCP services were detected, and
3.52 bidirectional UDP flows from which 26,077 UDP services were detected.

We then processed the packet data directly with Argus and PADS. PADS detected a total of 43,066 TCP services and Argus produced:
3.87 million unidirectional TCP flows,
10.10 million unidirectional UDP flows,
2.85 bidirectional TCP flows,
3.87 bidirectional UDP flows.

We note that PADS does not support the detection of UDP services.

First note the discrepancies between the number of unidirectional and bidirectional flows produced by Argus and the software application 30. These differences come from the distinct cut off and aggregation rules that the two programs apply. In order to evaluate how accurately the software application 30 can decide on the orientation of flows, all bidirectional flows were aggregated regardless of their orientation using a key based on the hash value computed from the source/destination IP addresses, protocol and source/destination ports. The inventors then compared for each key if Argus and the software application 30 agreed or disagreed on the orientation of the bidirectional flow represented. This comparison led to three cases: 1) the software application 30 and Argus agreed, 2) the software application 30 and Argus disagreed, and 3) Argus output multiple orientations for a given bidirectional flow key, so the agreement was mixed. On the 5.94 unique bidirectional flow keys evaluated, the software application 30 and Argus agreed 79.60% of the time, disagreed 12.70% of the time and results were mixed for the remaining 7.70%.

To analyze further these results, the inventors first broke them down according to the output of the Bayesian inference that the software application 30 calculated to decide on the orientation of each bidirectional flows. The Bayesian inference output can be seen as a confidence value, where 0.5 means that the software application 30 could not decide on the orientation of the bidirectional flow, and 1 means the software application 30 was 100% sure on the orientation to apply. The percentage of agreement between Argus and the software application 30 shows that the accuracy increases with the probability provided by the Bayesian inference output. This empirical result shows that by using flows instead of packet data, the software application 30 has reduced accuracy but can still provide indication to a network administrator on the confidence of the results.

On the subset of flows where Argus could unequivocally decide on flow direction, the overall accuracy of the software application 30 to generate correctly oriented bidirectional flows is 86.24%, and 87.32% when the software application 30 is certain. The next step in the evaluation is to understand precisely how much combining heuristics through Bayesian inference helped to reach this result. The accuracy of each heuristic is individually measured and the heuristic output is compared against, respectively, Argus and the end decision taken by the Bayesian inference of the software application 30. The results indicate that heuristics H.1 to H.6 have an accuracy ranging from 74.37% to 78.28%, all below the accuracy of 79.60% of the Bayesian inference. H.0 provides very good accuracy (96.61% on the subset of flows where it could decide) but unfortunately only 14.38% of bidirectional flows were identified from non-identical timestamps. The inventors believe that this result strongly depends on the latency of the network where the data is recorded, since an important latency can create enough delays between request and reply flows for H.0 to be conclusive. The inventors conclude first that besides H.0, the heuristics strongly agree with the Bayesian inference decision, which indirectly means that heuristics rarely contradict each other. A second conclusion is that one main advantage of using Bayesian inference is to be able to bridge the indecision gap between heuristics. Indeed, the inventors calculated that the Bayesian inference output was inconclusive (i.e. it outputs a probability of 0.5) in only 0.01% of the case, which is below the rates of all heuristics taken individually.

The last part of the evaluation measured the accuracy of the service detection capability of the software application 30 by using PADS as the baseline. Since PADS detects only TCP services, the focus was only on TCP traffic. The numbers of unique TCP services detected are:

total from the software application 30: 64,104,
  total from PADS: 43,066,
  from both the software application 30 and PADS: 32,139,
  from the software application 30 only: 31,965,
  from PADS only 10,927.

These results indicate apparently that the software application 30 produced 31,965 false positives and missed 10,927 services. After looking more carefully at the services detected by the software application 30 only, the inventors discovered that 60.64% of these false positives were actually due to TCP transactions from which no SYN flag have been recorded in the dataset. The absence of the SYN flag can be explained because some TCP transactions started before the beginning of our packet data collection. The inventors also discovered that the service detection functionality of PADS depends on the presence of the SYN flag. As a result, these services are actually not false positives but services from ongoing TCP transactions. Regarding the 10,927 services missed by the software application 30, the inventors looked at the bidirectional flows from which these services could have been detected and we discovered that:

2,061 services were from unidirectional flows,
  2,641 services were from invalid bidirectional flows,
  3,797 services were from a combination of unidirectional flows and invalid bidirectional flows,
  1,035 services were from valid bidirectional flows, and
  the remaining 1,393 flows were from a combination of valid bidirectional flows and unidirectional or invalid bidirectional flows.

As mentioned above, the rule applied by the software application 30 to discriminate valid from invalid bidirectional flows is to rely on the presence of the ACK flag and at least two packets for both the request and reply flow. PADS does not make such a distinction and, as such, was able to detect invalid services. This is a design choice and the inventors believe that differentiating valid from invalid flows help network operators to identify suspicious activity such as scanning where TCP handshakes are not completed. The large volume of services missed because of unidirectional flows is explained by the fact that some request and reply flows were expired and therefore recorded in distinct flow files. As a result, the software application 30, which is working on one file at a time, could not merge them and generate bidirectional flows. Keeping track of unidirectional flows over multiple contiguous flow files could solve this issue, but would also reduce the scalability of the tool. Finally, missed services that could be linked to valid bidirectional flows are due to incorrect flow orientation decided by the combination of heuristics. The inventors are continuing to investigate these flows to understand if implementing additional heuristics could reduce the volume of missed services. In light of the large number of services missed by PADS because no SYN flag was recorded, the inventors redefined true and false positives as follows:

True positives are services detected by both the software application 30 and by PADS, as well as services detected by the software application 30 only but from bidirectional flows without SYN flag recorded, and
  false positives are services detected by the software application 30 only from bidirectional flows having the SYN flag recorded.

Using these definitions the accuracy of the software application 30 was assessed according to the output value of the Bayesian inference. From 0.7 to 1.0, the accuracy increases with the Bayesian inference output. The numbers of services detected for values below 0.7 are too low to be significant.

Figure 7:
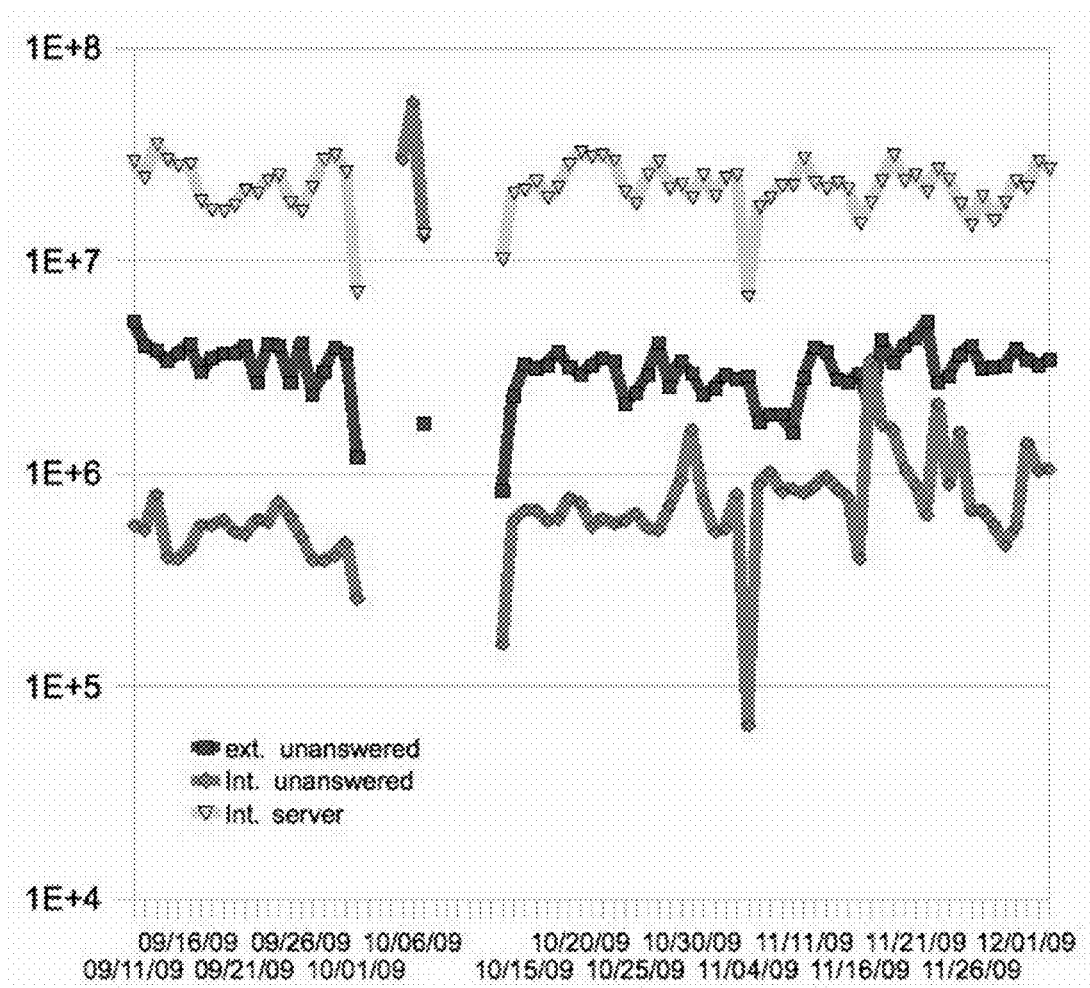

FIGS. 7 and 8 are graphical user interfaces illustrating case studies, according to exemplary embodiments. The first case study involved a longitudinal survey over 83 days of the most active servers and sources of unanswered activity in the organization network, and the second case study involved examples of malicious activity detected and visualized over 19 days at the University of Maryland. These examples were reported by a front-end software application developed to query and visualize the data generated by the software application 30.

FIG. 7 illustrates the number of flows for internal servers and internal and external sources of unanswered activity over 83 days. From a security and network management point of view, having access to bidirectional flow data offers the important advantage of being able to differentiate valid communications, where network requests are answered by network replies, from invalid communications, where network requests are unanswered. As such, the sources and destinations of both valid network transaction (from valid bidirectional flows) and unanswered activity (from unidirectional or invalid bidirectional flows) can be directly extracted from the data collected by the software application 30. This last category includes scanning activity, misconfiguration, backscatter from denial of service attacks and requests that could not be matched to replies by the software application 30. FIG. 7 provides an overview of 83 days of flows collected at the border of the University of Maryland network. The three time series represent the total number of flows for 1) internal servers, 2) internal sources of unanswered activity and 3) external sources of unanswered activity. The gap on the first week of October is due to the replacement of a network device during which the flow data collection had to be stopped. From FIG. 7 the inventors calculated that on a daily average, servers hosted inside the organization network where exchanging 22.9 millions of flows with external hosts, internal hosts were sending 0.8 million unanswered request flows towards outside, and finally external hosts were sending 3.2 million unanswered request flows towards inside. The numbers of unanswered flows indicate the volume of scanning activity, and it is interesting to understand from the different pikes in FIG. 7 the outbursts of suspicious activity. For example on Nov. 17, 2009 the spike in the internal sources of unanswered activity is due to a single internal compromised host aggressively scanning for port 3050 (hosting the Firebird relational database) with an estimated 55 thousand hosts targeted.

To investigate further the activity related to port 3050, the dataset provided by the software application 30 was queried for a weekly report of internal and external client, server and scanner activities. Clients and servers are extracted from valid bidirectional end points, while scanners are known from source end points producing a large number of unanswered request flows. If the inventors only had access to unidirectional flows, differentiating clients from scanners would not have been possible.

FIG. 8 illustrates details of weekly internal and external activities for port 3050. The number of flows for internal servers and internal and external sources of unanswered activity over 83 days. FIG. 8 illustrates how the malicious activity propagated. During the first two weeks, few internal hosts are serving legitimate traffic on port 3050. On week 39, a single external scanner sent 46,642 flows to try to find internal servers to compromise. The reader may see from the external client activity that this scanner was able to find few servers. This pattern continues the following weeks and this external scanner finds more and more internal servers. On week 43, the first internal scanning activity on port 3050 is detected with 2,723 unanswered flows sent. Then on week 47, the massive scanning that we detected in the spike in FIG. 7 appears, with a total of 482,315 unanswered flows sent. This timeline reveals that a security administrator who had access to this data could have detected the external scanning activity starting on week 39, then could query the software application 30 to precisely know the population of internal servers listening on port 3050, and finally ascertain whether each of them is not vulnerable and is properly protected.

Figure 9:
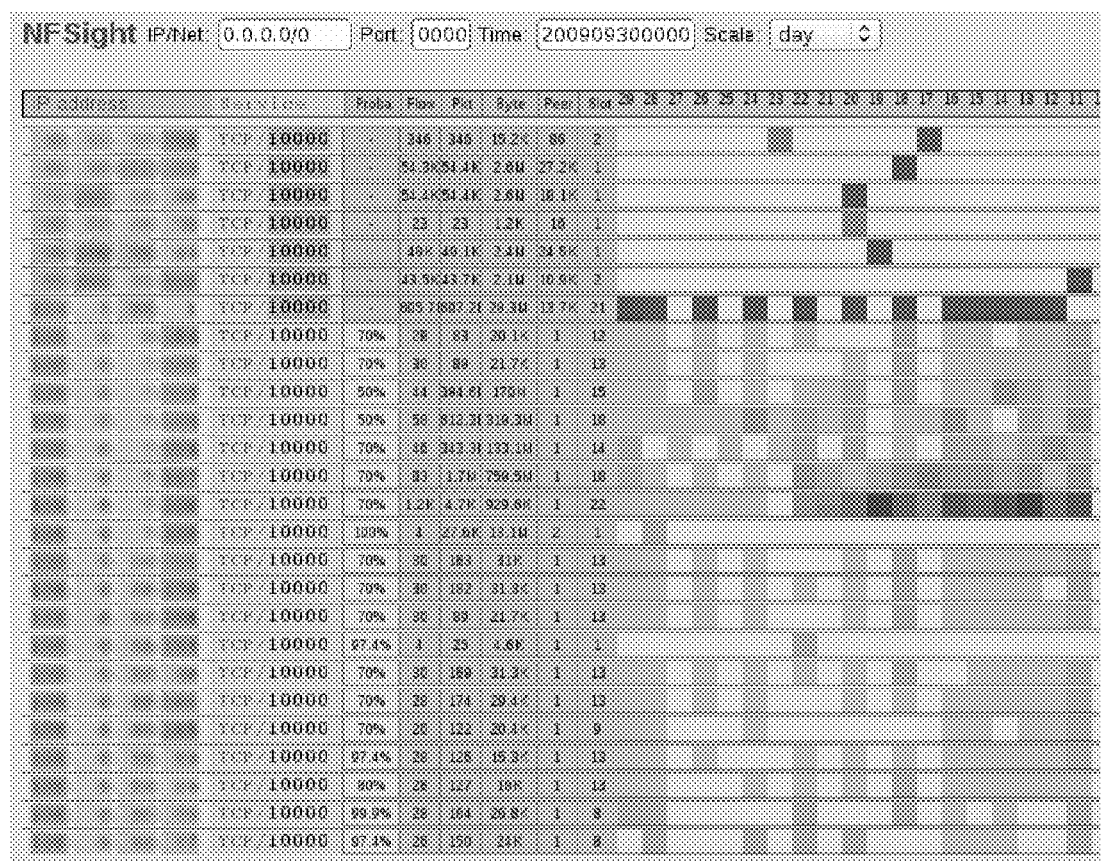
FIGS. 9-11 are schematics illustrating examples of malicious activity, according to exemplary embodiments.
Figure 10:
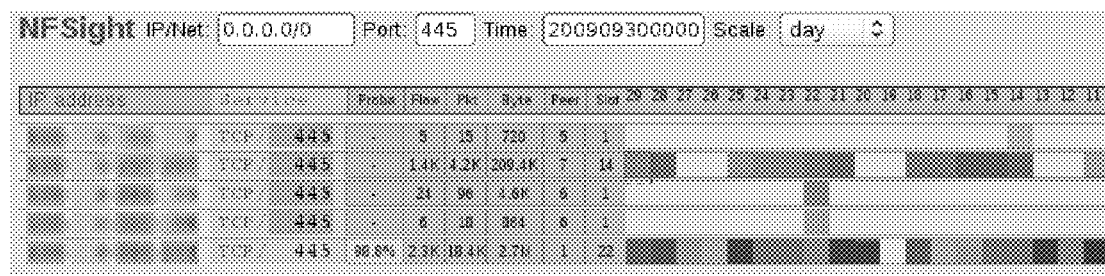
Figure 11:
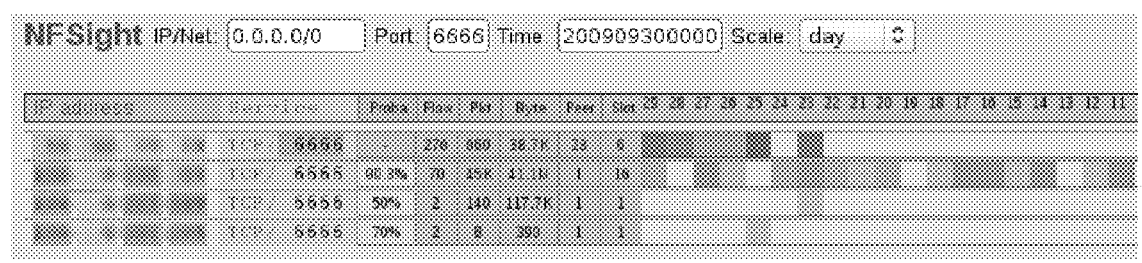

FIGS. 9-11 are graphical user interfaces illustrating detection of malicious activity, according to exemplary embodiments. FIG. 9 provides a snapshot of network service activity for port TCP/10000 over 19 days. This port is known to host the Webmin application, which has been shown to be vulnerable to remote exploits. FIG. 9 has two parts: the top part (perhaps colored in red) shows external hosts scanning the organization network to find vulnerable applications on port TCP/10000. The bottom part (perhaps colored in green) represents internal hosts listening on port TCP/10000. Coloring may be added based on the number of unanswered unidirectional flows (red) versus valid bidirectional flows (green). Moreover, the average number of peers displayed for each end point in the metric section clearly discriminates scanning activity (between 16 and 27,200 peers scanned per day) and server activity (1 peer on the average per day).

Identifying server end points allows us also to identify client and scanner end points. Specifically, a scanner is a client that tries to contact more than a given number of nonexistent servers. A threshold of 5 nonexistent servers in 5 minutes was used. The software application 30 was able to quickly spot compromised machines that attempted to infect their neighbors. For example, FIGS. 10 and 11 illustrate nineteen (19) days of activity for ports TCP/445 and TCP/6666, respectively. FIG. 10 illustrates Worm infection on port TCP/445 Port, while FIG. 11 illustrates Scanning traffic on port TCP/6666. TCP/445 hosts the file and resource sharing application of the Windows operating system, and is one of the most frequently used ports by worms such as Conficker [14] to infect machines. FIG. 10 indicates that four internal hosts seem infected and generate a significant volume of unanswered unidirectional flows (colored in red). A fifth host is likely to be a legitimate Windows machine serving clients on port TCP/445 (perhaps colored in green). FIG. 11 indicates one suspicious external host scanning port TCP/6666 (perhaps colored in red) and three internal hosts exchanging valid bidirectional flows (perhaps colored in green). Port TCP/6666 is one of the default port used for IRC, which is known to carry command and control traffic for botnets (see E. Cooke, F. Jahanian, and D. McPherson, *The Zombie Roundup: Understanding, Detecting, and Disrupting Botnets*, Proc. on the First Workshop on Steps to Reducing Unwanted Traffic on the Internet (STRUTI), 2005, pp. 39-44).

The software application 30 offers network operators and security administrators access to bidirectional flows without the issue of having to instrument the network with new costly sensors. The above paragraphs showed how important the data produced by the software application 30 could be to immediately gain visibility over the organization's network. Moreover, running on top of NetFlow offers the important advantages of not being affected by encrypted traffic or by privacy issue related to deep packet inspection. Here, though, future work is discussed. As previously explained, the results discussed above were related to non-sampled flows. Results from other evaluations of passive detection techniques indicate that sampling has a limited impact on the overall accuracy. For example, Bartlett, et al. report that capturing only 16% of the data results only in an 11% drop in discovered servers. See G. Bartlett, J. Heidemann, and C. Papadopoulos, *Understanding Passive and Active Service Discovery*, Proc. 7th ACM SIGCOMM Conference on Internet Measurement, 2007, pp. 57-70. The inventors believe, however, that random flow sampling will likely break the correct detection of bidirectional activity. Future work, then, may precisely assess the effect of sampling on the detection accuracy of the different heuristics. Furthermore, the results discussed above were related to asymmetric routing. It was assumed in this study that NetFlow collectors covered the pathways for both requests and replies. In some organizational networks, replies and requests can sometimes take different routes for which there is no NetFlow collector deployed. Such architecture would again break the pairing of unidirectional flows into bidirectional flows. Finally, in these results, the software application 30 worked at the network layer and therefore heavily relied on port numbers. As a consequence, it can be difficult or impossible for a network operator to identify the application behind a service detected by the software application 30. This issue arises from the fact that some applications use random ports or hide behind well known ports. For example SKYPE® is famous for using port 80 or port 443, normally reserved to web traffic, in order to evade firewall protection (SKYPE® is a registered trademark of Skype Limited). Related work by Erman, et al. on flow-based traffic classification proved that it is possible to accurately identify applications using only NetFlow. See J. Erman, A. Mahanti, M. Arlitt, and C. Williamson, *Identifying and Discriminating Between Web and Peer-to-Peer Traffic in the Network Core*, Proc. of the 16th International Conference on World Wide Web, 2007, p. 892. Future work may involve developing additional heuristics for the software application 30 to be able to precisely classify traffic regardless of port number. These heuristics can work on 1) relationships between flow characteristics, such as the ratio between number of packets and number of bytes or the time distribution of flows, and 2) relationships between hosts. The inventors believe that discovering communication patterns between hosts would be useful not only to identify applications but also large communication structures such as those used by P2P networks or botnets.

Figure 12:
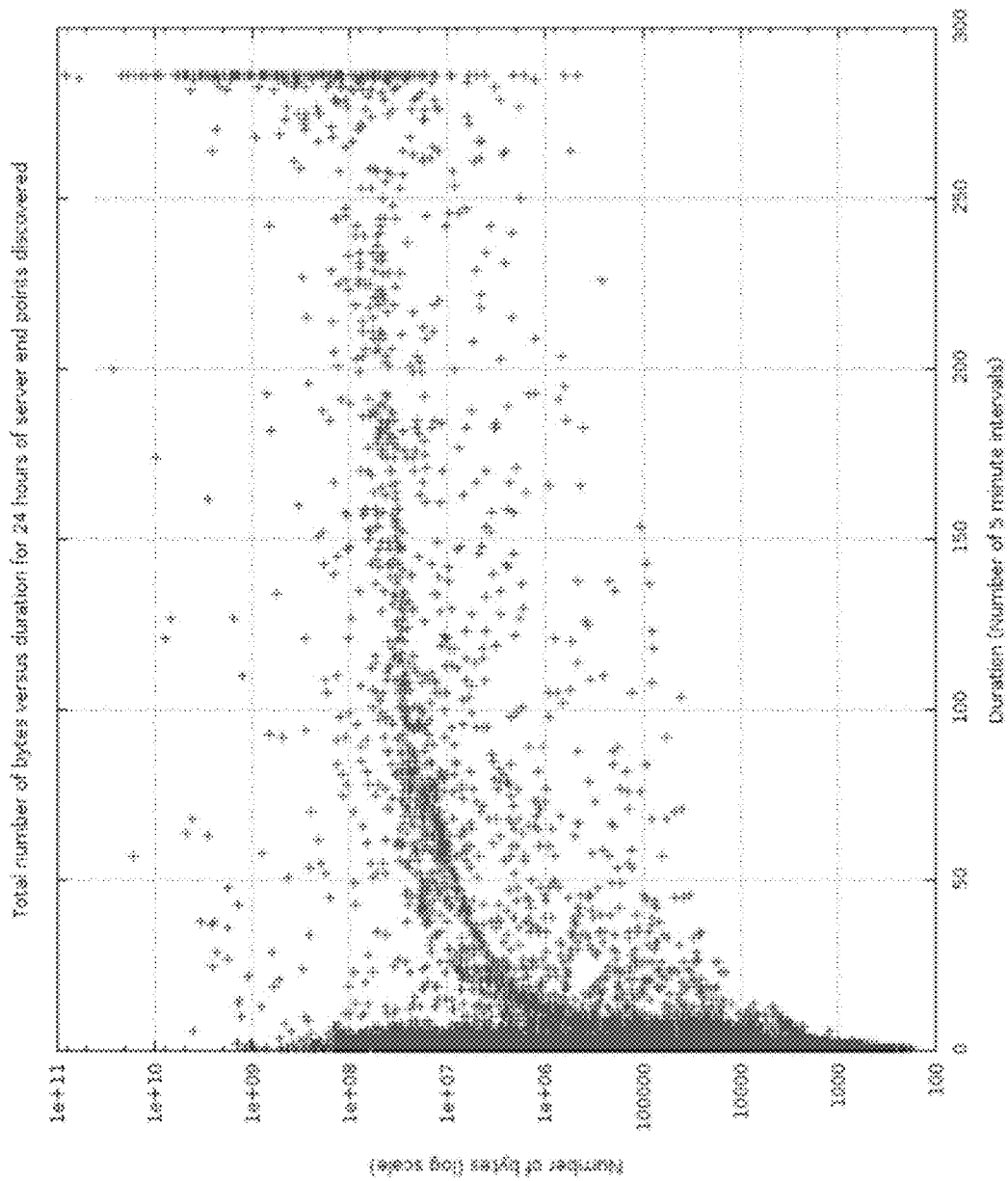
FIG. 12 is a schematic illustrating preliminary results, according to exemplary embodiments.

FIG. 12 is another graphical user interface illustrating preliminary results, according to exemplary embodiments. FIG. 12 plots the number of bytes vs. duration of activity for 24 hours of server end points discovered. FIG. 12 provides some preliminary results with 24 hours of internal servers passively detected by the software application 30 and mapped using two characteristics: 1) the total number of bytes exchanged by each server end point, and 2) the number of "5 minute" intervals during which each server end point was active. FIG. 12 illustrates several clusters that could help a network operator to understand the traffic load and the behavior of network applications in the organization. For example, P2P applications are known to open transient ports to exchange a large volume of traffic over short period of time. Servers in the top left part of FIG. 12 display such behavior.

Exemplary embodiments, in conclusion, describe a novel approach to combine server detection heuristics using Bayesian inference. Exemplary embodiments include a passive server discovery architecture and application that requires only NetFlow to run. The evaluation of the software application 30 in an academic network of 40,000 computers reveals that the Bayesian inference succeeds in improving the accuracy of the different heuristics and provides to network operators a meaningful confidence value for each server discovered. When this confidence is at its higher value, the software application 30 detects the correct orientation of 87% of the bidirectional flows processed, and identifies 93% of the servers. Finally, the different case studies show how the network visibility offered by the software application 30 provides a simple and efficient solution for network operators and security analysts to detect security compromises, to find undocumented and potentially vulnerable servers and to forensic security issues.

Figure 13:
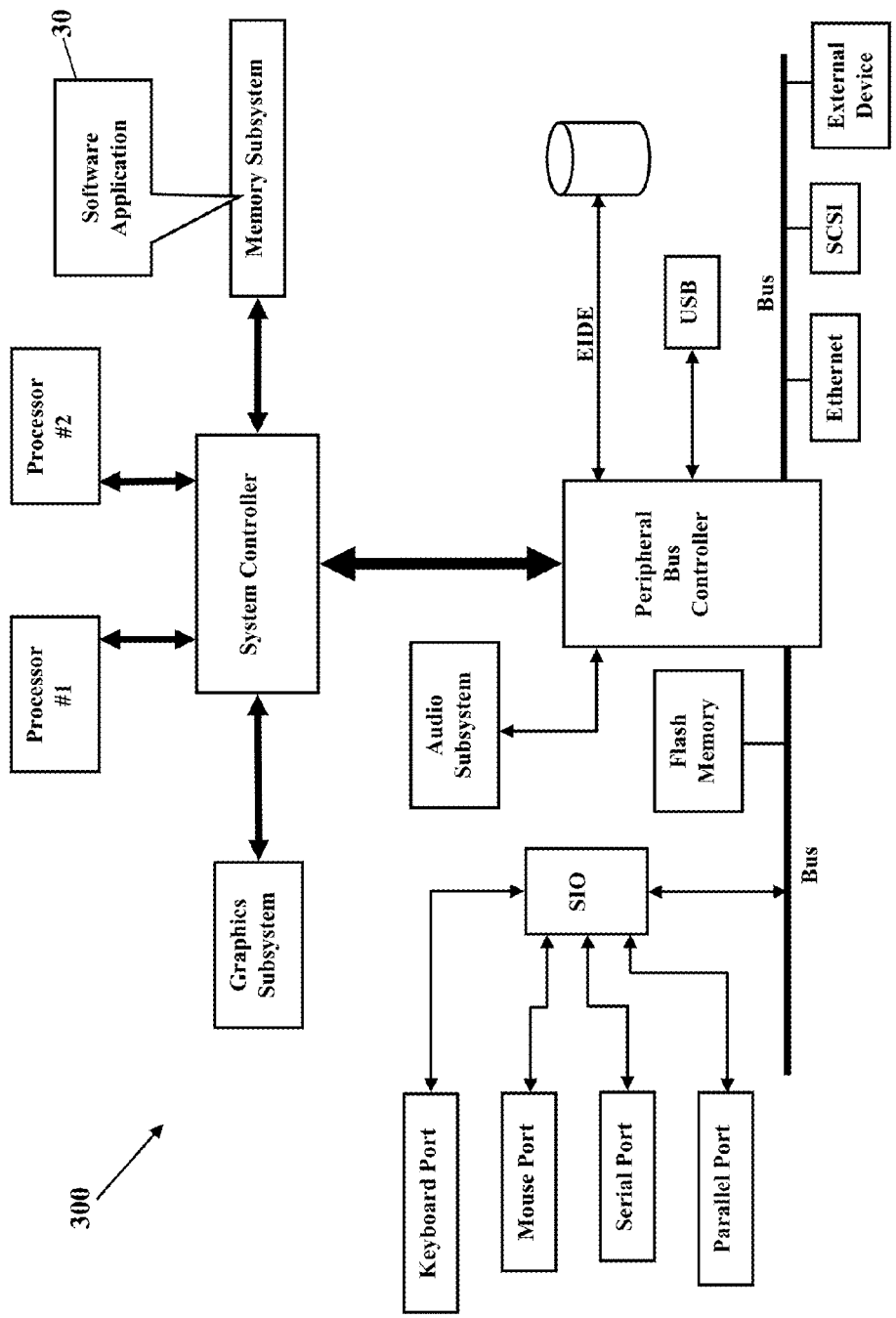
FIG. 13 is a schematic illustrating a processor-controlled device, according to exemplary embodiments.

FIG. 13 is a schematic illustrating still more exemplary embodiments. FIG. 13 is a generic block diagram illustrating the software algorithm 30 operating within a processor-controlled device 300. As paragraph [0012] explained, the software algorithm 30 may operate in any processor-controlled device 300. FIG. 13, then, illustrates the software algorithm 30 stored in a memory subsystem of the processor-controlled device 300. One or more processors communicate with the memory subsystem and execute the software algorithm 30. Because the processor-controlled device 300 illustrated in FIG. 13 is well-known to those of ordinary skill in the art, no detailed explanation is needed.

Figure 14:
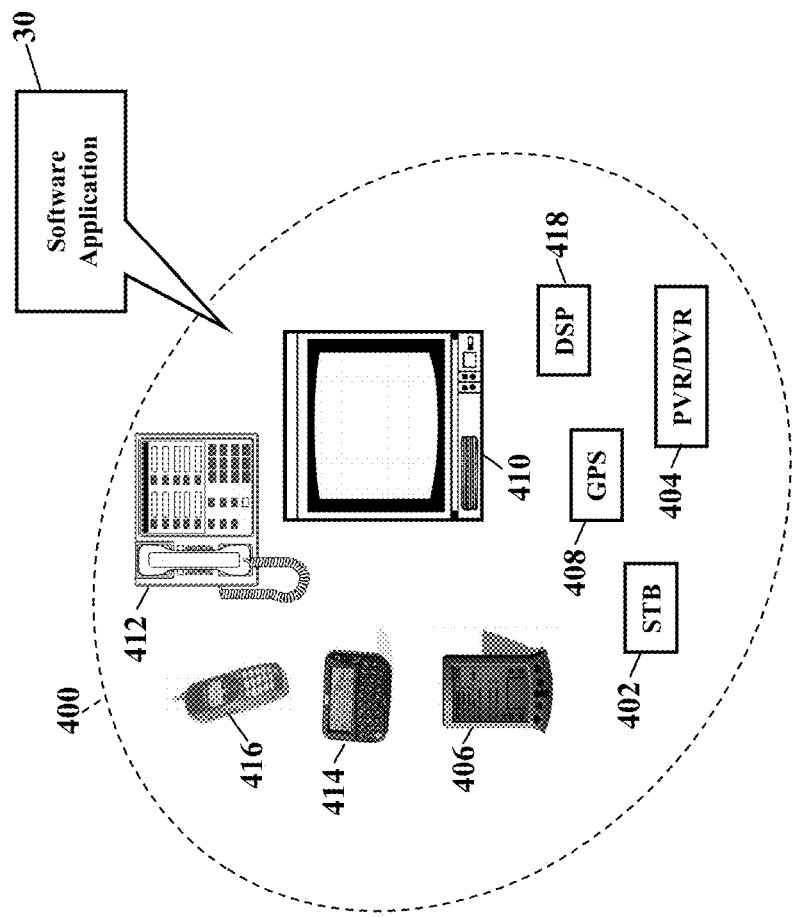
FIG. 14 depicts other possible operating environments for additional aspects of the exemplary embodiments.

FIG. 14 depicts other possible operating environments for additional aspects of the exemplary embodiments. FIG. 14 illustrates the software algorithm 30 operating within various other devices 400. FIG. 14, for example, illustrates that the software algorithm 30 may entirely or partially operate within a set-top box ("STB") (402), a personal/digital video recorder (PVR/DVR) 404, personal digital assistant (PDA) 406, a Global Positioning System (GPS) device 408, an interactive television 410, an Internet Protocol (IP) phone 412, a pager 414, a cellular/satellite phone 416, or any computer system, communications device, or processor-controlled device utilizing the processor 50 and/or a digital signal processor (DP/DSP) 418. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for using heuristics to answer difficult questions, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of detecting a server operating in a network, comprising:

collecting Internet Protocol traffic information;

merging the Internet Protocol traffic information having a common source address and a common destination address;

merging the Internet Protocol traffic information having a source address and an opposing destination address to generate bidirectional flows;

separating valid bidirectional flows from invalid bidirectional flows;

retrieving a set of heuristic rules from memory for determining the server;

determining an output of each heuristic rule in the set of heuristic rules based on the valid bidirectional flows;

combining all outputs produced by the set of heuristic rules; and generating a probability that the source address corresponds to the server based on combined outputs produced by the set of heuristic rules.

2. The method according to claim 1, further comprising determining the source address fails to correspond to the server.

3. The method according to claim 1, further comprising determining the destination address corresponds to a client.

4. The method according to claim 1, further comprising receiving NetFlow information as the Internet Protocol traffic information.

5. The method according to claim 1, further comprising retrieving an interval of time for collecting the Internet Protocol traffic information.

6. The method according to claim 1, further comprising retrieving an interval of time for merging the Internet Protocol traffic information having the common source address and the common destination address.

7. The method according to claim 1, further comprising retrieving an interval of time for merging the Internet Protocol traffic information having the source address and the opposing destination address.

8. A system, comprising:
a processor; and
memory storing code that when executed causes the processor to perform operations, the operations comprising:
collecting Internet Protocol traffic information;
merging the Internet Protocol traffic information having a common source address and a common destination address to generate unidirectional flows;
merging the Internet Protocol traffic information having a source address and an opposing destination address to generate bidirectional flows;
separating valid bidirectional flows from invalid bidirectional flows;
retrieving a set of heuristic rules from memory for determining the server, wherein one heuristic rule differentiates the server from a client based on a difference in timestamps of the unidirectional flows;
determining an output of each heuristic rule in the set of heuristic rules based on the valid bidirectional flows;
combining all outputs produced by the set of heuristic rules; and
generating a probability that the source address corresponds to the server based on combined outputs produced by the set of heuristic rules.

9. The system according to claim 8, wherein the operations further comprise determining the source address fails to correspond to the server.

10. The system according to claim 8, wherein the operations further comprise determining the destination address corresponds to the client.

11. The system according to claim 8, wherein the operations further comprise receiving NetFlow information.

12. The system according to claim 8, wherein the operations further comprise retrieving an interval of time for collecting the Internet Protocol traffic information.

13. The system according to claim 8, wherein the operations further comprise retrieving an interval of time for merging the Internet Protocol traffic information having the common source address and the common destination address.

14. The system according to claim 8, wherein the operations further comprise retrieving an interval of time for merging the Internet Protocol traffic information having the source address and the opposing destination address.

15. A memory storing executable instructions that when executed cause a processor to perform operations, the operations comprising:
collecting Internet Protocol traffic information;
merging the Internet Protocol traffic information having a common source address and a common destination address to generate unidirectional flows;
merging the Internet Protocol traffic information having a source address and an opposing destination address to generate bidirectional flows;
separating valid bidirectional flows from invalid bidirectional flows;
retrieving a set of heuristic rules from memory, the set of heuristic rules differentiating the server from a client based on a difference in timestamps of the unidirectional flows;
determining an output of each heuristic rule in the set of heuristic rules based on the valid bidirectional flows;
combining all outputs produced by the set of heuristic rules; and
generating a probability that the source address corresponds to the server based on combined outputs produced by the set of heuristic rules.

16. The memory according to claim 15, wherein the operations further comprise determining the source address fails to correspond to the server.

17. The memory according to claim 15, wherein the operations further comprise determining the destination address corresponds to the client.

18. The memory according to claim 15, wherein the operations further comprise receiving NetFlow information.

19. The memory according to claim 15, wherein the operations further comprise retrieving an interval of time for collecting the Internet Protocol traffic information.

20. The memory according to claim 15, wherein the operations further comprise retrieving an interval of time for merging the Internet Protocol traffic information having the common source address and the common destination address.

* * * * *